(12) United States Patent
Hsu et al.

(10) Patent No.: US 12,552,671 B2
(45) Date of Patent: Feb. 17, 2026

(54) PREPARATION AND APPLICATION OF THREE-DIMENSIONAL CARBON NANOTUBES GROWN FROM SOIL CLAY AND GRAPHENE OXIDE

(71) Applicant: Kun Shan University, Tainan (TW)

(72) Inventors: Hao-Lin Hsu, Tainan (TW); Shuhn-Shyurng Hou, Tainan (TW)

(73) Assignee: Kun Shan University, Tainan (TW)

( * ) Notice: Subject to any disclaimer, the term of this patent is extended or adjusted under 35 U.S.C. 154(b) by 749 days.

(21) Appl. No.: 17/965,341

(22) Filed: Oct. 13, 2022

(65) Prior Publication Data

US 2024/0124310 A1 Apr. 18, 2024

(51) Int. Cl.
*C01B 32/162* (2017.01)
*B82Y 40/00* (2011.01)

(52) U.S. Cl.
CPC ............. *C01B 32/162* (2017.08); *B82Y 40/00* (2013.01); *C01B 2202/22* (2013.01); *C01P 2004/13* (2013.01); *C01P 2006/40* (2013.01)

(58) Field of Classification Search
CPC . C01B 32/162; C01B 2202/22; C01B 32/158; C01B 32/159; C01B 32/16; C01B 32/164; C01B 32/166; C01B 32/168; C01B 32/17; C01B 32/172; C01B 32/174; C01B 32/176; C01B 32/178; C01B 2202/00; C01B 2202/02; C01B 2202/04; C01B 2202/06; C01B 2202/08; C01B 2202/10; C01B 2202/20; C01B 2202/24; C01B 2202/26; C01B 2202/28; C01B 2202/30; C01B 2202/32; C01B 2202/34; C01B 2202/36; B82Y 40/00; C01P 2004/13; C01P 2006/40; D01F 9/12; D01F 9/127; D01F 9/1271; D01F 9/1272; D01F 9/1273;

(Continued)

(56) References Cited

PUBLICATIONS

Asgari, et al., Synthesis and characterization of a novel nickel pillared-clay catalyst: In-situ carbon nanotube-clay hybrid nanofiller from Ni-PILC, Applied Clay Science 2021; 205: 106064, pp. 1-10 (Year: 2021).*

(Continued)

*Primary Examiner* — Daniel C. McCracken
(74) *Attorney, Agent, or Firm* — Troutman Pepper Locke LLP; Tim Tingkang Xia, Esq.

(57) ABSTRACT

A method for preparing a three-dimensional carbon nanotube composite structure comprises: providing a substrate; subjecting the substrate to nickel ion modification treatment to form at least one nickel ion nuclear seed on the substrate; providing a hydrogen gas to pass through the substrate and heating the substrate to a reduction temperature for reducing the nickel ion nuclear seed by the hydrogen gas at the reduction temperature; and supplying a carbon source gas and a protective gas to pass through the substrate and heating the substrate to a growth temperature so that the carbon atoms generated by the carbon source gas through the catalytic cracking of the nickel ion nuclear seed are deposited on the bottom of the nickel ion nuclear seed to form a carbon nanotube gradually, wherein the growth temperature is greater than or equal to the reduction temperature. The three-dimensional carbon nanotube composite structure prepared by the method and its application are also disclosed.

12 Claims, 13 Drawing Sheets

(58) Field of Classification Search
CPC .... D01F 9/1274; D01F 9/1275; D01F 9/1276; D01F 9/1277; D01F 9/1278; D01F 9/133
See application file for complete search history.

(56) References Cited

PUBLICATIONS

Gnana kumar, et al., Three-Dimensional Graphene-Carbon Nanotube-Ni Hierarchical Architecture as a Polysulfide Trap for Lithium-Sulfur Batteries, ACS Appl. Mater. Interfaces 2018; 10: 20627-20634 with Supporting Information (Year: 2018).*

Rashid, et al., Catalyst Role in Chemical Vapor Deposition (CVD) Process: A Review, Rev. Adv. Mater. Sci. 2015; 40: 235-248 (Year: 2015).*

Gohier, et al., Carbon nanotube growth mechanism switches from tip-to base-growth with decreasing catalyst particle size, Carbon 2008; 46: 1331-1338 (Year: 2008).*

Boudjahem, et al., Study of nickel catalysts supported on silica of low surface area and prepared by reduction of nickel acetate in aqueous hydrazine, Journal of Catalysis 2004; 221: 325-334 (Year: 2004).*

* cited by examiner

PREPARATION AND APPLICATION OF THREE-DIMENSIONAL CARBON NANOTUBES GROWN FROM SOIL CLAY AND GRAPHENE OXIDE

FIELD OF THE INVENTION

The present invention relates to a preparation method of a three-dimensional carbon nanotube, and particularly relates to a three-dimensional carbon nanotube composite structure and its preparation method and related applications.

BACKGROUND OF THE INVENTION

In recent years, three-dimensional (3D) active materials for energy storage devices and capacitor electrodes have attracted worldwide attention due to their excellent properties such as energy density, power density, and long stable cycle life. The mixing and blending of one-dimensional (1D) and two-dimensional (2D) structural materials facilitate the preparation of 3D structural materials for energy storage, wherein the recent advances in the synthesis and design of 3D carbon-based electrodes for electrochemical supercapacitors (SC) electrodes typically use nickel foams, 2D graphene foams, and 1D multi-walled carbon nanotubes (CNTs) as the primary structural materials.

Carbon nanotubes are originally developed by Dr. Sumio Iijima of Nippon Electric Company (NEC). In 1991, when he conducted fullerenes synthesis experiment with an arc discharge method, he observed carbon clusters with a transmission electron microscope. It is found that the carbon clusters are mainly composed of multi-walled carbon nanotubes, which are tubular materials formed by rolling graphite planes. Its structure can be divided into two forms: single-walled and multi-walled carbon nanotubes. At present, the growth of such carbon nanotubes mostly uses mixed alloys as metal catalysts. For example, carbon source gas is introduced into the substrate provided with metal catalyst particles at high temperature to generate carbon nanotubes by CVD method.

However, this method of using metal catalysts as catalysts to generate carbon nanotubes still has many areas that need to be improved. For example, the cost of metal catalysts is relatively high, which is less economical. Moreover, the use of metal catalysts is not friendly to the environment, and it does not meet the needs of modern people in the current era of high environmental awareness. In addition, with the advancement of science and technology, precious metals and rare metals have been mined in large quantities and used in various technological products. Similarly, the metal catalysts also need to use some precious metals and rare metals. When the shortage of resources happens in the future, it is easy to generate competition for resources and leads to a substantial increase in manufacturing costs, and the large-scale mining of precious and rare metals is also likely to cause environmental pollution and damage.

Therefore, it has become a common concern of the industry and academia to seek other manufacturing methods that do not require the use of metal catalysts as catalysts to generate carbon nanotubes.

SUMMARY OF THE INVENTION

Therefore, regarding the aforementioned problem to be solved, the present invention discloses the preparation of carbon nanotubes in an environmentally friendly manner without adding a metal catalyst, which can not only reduce the manufacturing cost, but also reduce the consumption of precious metals and rare metals so as to overcome the aforementioned issues of common concern in the industry and academia.

Therefore, an object of the present invention is to provide a method for preparing a three-dimensional carbon nanotube composite structure, which comprises: step S1: providing a substrate; step S2: subjecting the substrate to nickel ion modification treatment to form at least one nickel ion nuclear seed on the substrate; step S3: providing a hydrogen gas to pass through the substrate and heating the substrate to a reduction temperature for reducing the nickel ion nuclear seed by the hydrogen gas at the reduction temperature; and step S4: supplying a carbon source gas and a protective gas to pass through the substrate and heating the substrate to a growth temperature so that the carbon atoms generated by the carbon source gas through the catalytic cracking of the nickel ion nuclear seed are deposited on the bottom of the nickel ion nuclear seed to form a carbon nanotube gradually, wherein the growth temperature is greater than or equal to the reduction temperature.

In some embodiments, the substrate is selected from a group consisting of soil clay, montmorillonite (MMT) and graphene oxide (GO).

In some embodiments, the substrate is a montmorillonite, and the step S2 comprises: immersing the montmorillonite in an aqueous solution of cetyltrimethylammonium bromide to form a treated montmorillonite with surfactant intercalation; washing the treated montmorillonite with deionized water and drying to form the dry treated montmorillonite; immersing the dry treated montmorillonite in an aqueous nickel acetate solution to replace the surfactant to form a modified montmorillonite containing intercalated nickel ions; and washing the modified montmorillonite with deionized water and dry to obtain the modified montmorillonite powder, wherein the modified montmorillonite powder contains a plurality of the nickel ion nuclear seeds.

In some embodiments, the substrate is graphene oxide, and the step S1 comprises preprocessing a plurality of sheets of graphene oxide into a gel to form a gel containing the graphene oxide, the step S2 comprises: mixing the gel containing the graphene oxides and ethylene glycol with heat to prepare a hydrogel solution; washing the hydrogel solution with deionized water to form a neutral hydrogel; immersing the neutral hydrogel in an aqueous nickel sulfate solution to form a modified hydrogel solution, and the modified hydrogel is separated by centrifugation; freeze-drying the modified hydrogel to produce a modified aerogel; and grinding the modified aerogel to obtain modified graphene oxide powders, wherein the modified graphene oxide powders comprise a plurality of the nickel ion nuclear seeds.

In some embodiments, the carbon source gas comprises carbon monoxide, methane, acetylene, ethane, ethylene, propylene or propyne; the protective gas comprises hydrogen, nitrogen, ammonia or inert gas.

Another object of the present invention is to provide a three-dimensional carbon nanotube composite structure, which comprises: a substrate; at least one nickel ion nuclear seed disposed on the substrate; and at least one carbon nanotube connected to the nickel ion nuclear seeds.

In some embodiments, the substrate is selected from a group consisting of soil clay, montmorillonite (MMT) and graphene oxide (GO).

In some embodiments, the substrate comprises a multi-layer structure, and the nickel ion nuclear seed is inserted between layers of the multi-layer structure.

Another object of the present invention is to provide a working electrode, which comprises a conducting and draining material; a conductive adhesive material disposed on the conducting and draining material; and a plurality of three-dimensional carbon nanotube composite structures disposed on the conductive adhesive material.

In some embodiments, the conducting and draining material comprises ITO conductive glass, FTO conductive glass, nickel bubble mesh, lead plate, carbon plate that is resistant to acid and alkali, conductive polymer composite material or stainless steel metal material; the conductive adhesive material comprises carbon tape, carbon cloth, graphite felt, carbon felt, graphite paper, carbon paper, graphite brush, carbon brush, conductive glue, conductive silver glue or conductive polymer.

According to the preparation method provided by the present invention, the three-dimensional carbon nanotube composite structure has the following advantages:

1. The method of the three-dimensional carbon nanotube composite structure prepared by the present invention is an environmentally friendly process method, and the three-dimensional carbon nanotube composite structure can be prepared without adding a metal catalyst in the process.
2. The process of the three-dimensional carbon nanotube composite structure prepared by the present invention utilizes nickel ion modification treatment to form nickel ion nuclear seeds on the substrate, so there is no need to use precious metals and rare metals as catalysts in the process. It can effectively reduce the manufacturing cost, which is economical and environmentally friendly.
3. The three-dimensional carbon nanotube composite structure can be prepared without adding a metal catalyst in the process of the three-dimensional carbon nanotube composite structure prepared by the present invention, so the process of the present invention can significantly reduce the needs of precious metals and rare metals.
4. The three-dimensional carbon nanotube composite structure prepared by the present invention is that the one-dimensional carbon nanotube and the two-dimensional layered substrate are joined at the bottom of the base to increase the electrical conductivity of the carbon nanotube and the layered substrate. The electron and ion double layers and electron transfer are stabilized, which can effectively improve the electrode capacitance and energy density.

DETAILED DESCRIPTION OF THE INVENTION

Figure 1:
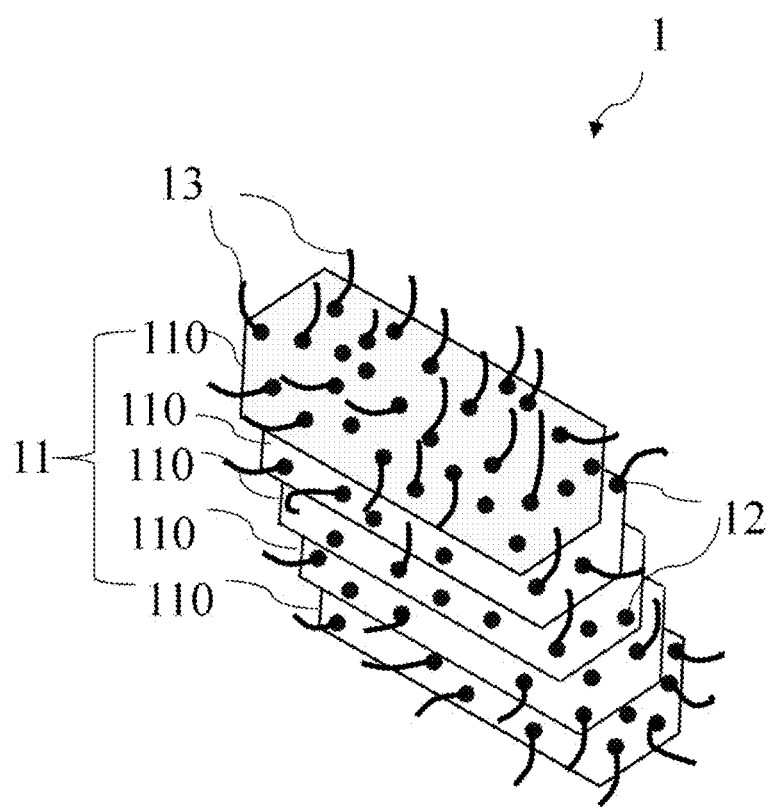
FIG. 1 is a schematic diagram of a three-dimensional carbon nanotube composite structure of the present invention.

One embodiment of the present invention provides a three-dimensional carbon nanotube composite structure 1, please refer to FIG. 1, which comprises a substrate 11, a plurality of nickel ion nuclear seed 12 and a plurality of carbon nanotubes 13, wherein the plurality of nickel ion nuclear seed 12 are disposed on the substrate and the plurality of carbon nanotubes 13 are connected to the nickel ion nuclear seeds 12. In this embodiment, the substrate 11 has a multi-layer structure, a plurality of nickel ion nuclear seeds 12 are distributed on each layer 110 of the substrate 11, and the carbon nanotubes 13 can be catalyzed by the nickel ion nucleation seeds 12 to extend and grow from the substrate 11 in all directions to form the three-dimensional carbon nanotube composite structure 1.

It can be understood that the multi-layered structure of the substrate 11 may be caused by the structural properties of the substrate 11 itself, for example, soil clay, such as montmorillonite (MMT) itself is a kind of multilayered aluminosilicate minerals. Alternatively, the multi-layered structure of the substrate 11 can be formed by stacking multiple sheets of material, such as graphene oxide (GO), which is itself a sheet-like graphene oxide, so the substrate 11 formed by the composition of multiple sheet-like graphene oxide is automatically stacked to form a multi-layer structure.

In this embodiment, nickel ion modification treatment is performed on the substrate 11 to form a plurality of nickel ion nuclear seeds 12 on the substrate 11. Since the substrate 11 includes a multi-layer structure, the nickel ion nuclear seeds 12 can be not only distributed on the outer surfaces such as the upper surface and the lower surface of the substrate 11, but also inserted between the layer 110 and layer 110 of the multilayer structure of the substrate 11.

Figure 2:
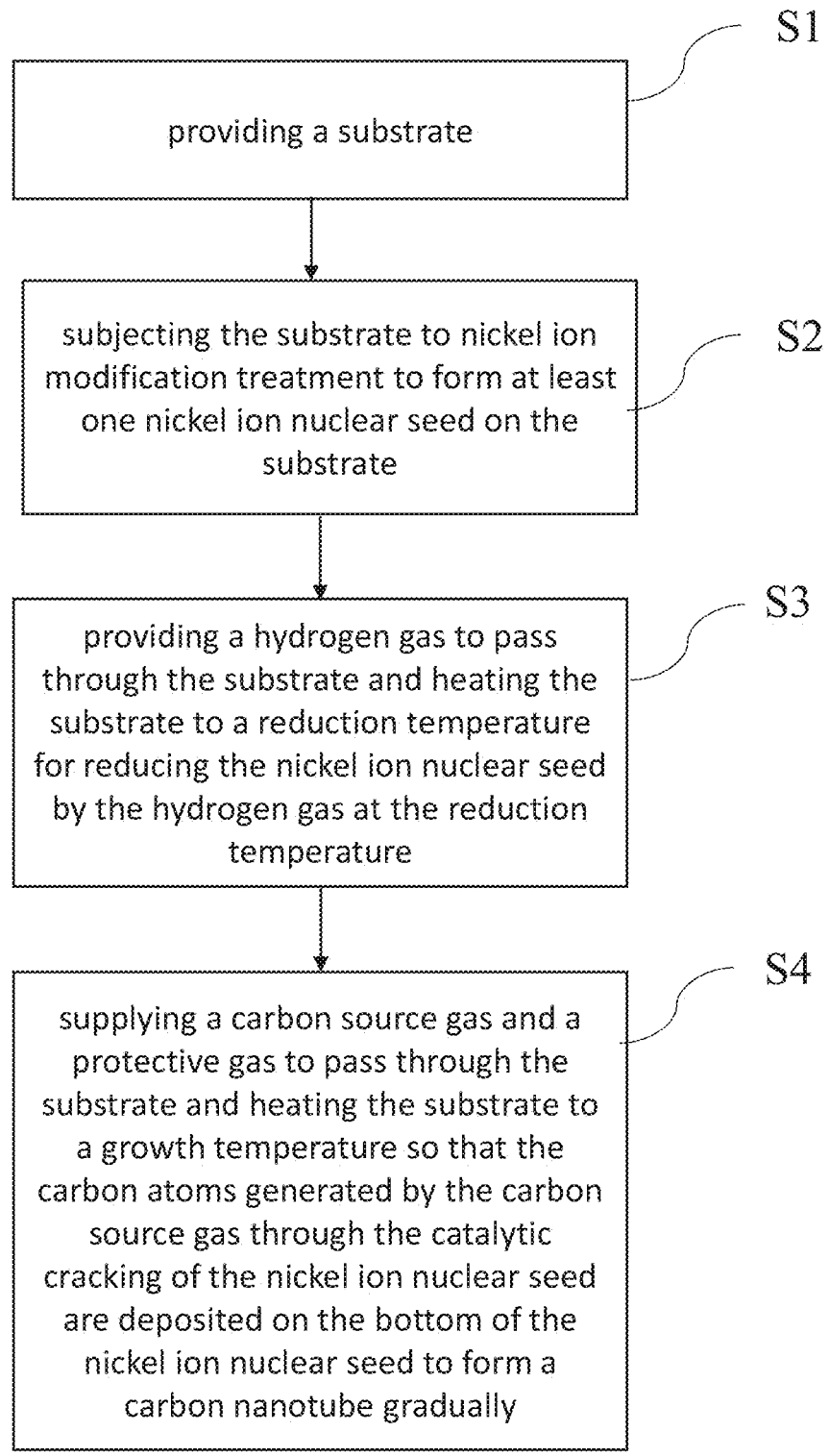
FIG. 2 is a schematic flow chart of a method for preparing a three-dimensional carbon nanotube composite structure according to the present invention.

Another embodiment of the present invention provides a method for preparing a three-dimensional carbon nanotube composite structure, please refer to FIG. 2, and the steps comprise:

step S1: providing a substrate, wherein the substrate contains a multi-layered structure such as one or a combination of soil clay, montmorillonite (MMT), and multi-sheet graphene oxide (GO);

step S2: subjecting the substrate to nickel ion modification treatment to form at least one nickel ion nuclear seed on the substrate;

step S3: providing a hydrogen gas to pass through the substrate and heating the substrate to a reduction temperature for reducing the nickel ion nuclear seed by the hydrogen gas at the reduction temperature; and step S4: supplying a carbon source gas and a protective gas to pass through the substrate and heating the substrate to a growth temperature so that the carbon atoms generated by the carbon source gas through the catalytic cracking of the nickel ion nuclear seed are deposited on the bottom of the nickel ion nuclear seed to form a carbon nanotube gradually, wherein the growth temperature is greater than or equal to the reduction temperature.

In some embodiments, the substrate is a montmorillonite (MMT), and the step S2 further comprises:

About 2.0 g of the montmorillonite mineral powder is immersed in a 0.014 M aqueous solution of cetyltrimethylammonium bromide (CTAB) and stirred for 12 hours to form a treated montmorillonite containing an embedded surfactant-intercalated;

The treated montmorillonite is washed several times with deionized water, then centrifuged and dried at 70° C. to form the dry treated montmorillonite;

The dry treated montmorillonite is immersed in a 0.025 M nickel acetate ($Ni(CH_3COO)_2 \cdot 4H_2O$) aqueous solution and stirred for 24 hours to replace the surfactant compound on the treated montmorillonite, and centrifuging the aqueous solution to form the modified montmorillonite rich in nickel ion intercalation; and The modified montmorillonite is repeatedly washed with deionized water, and dried in vacuum to collect the modified montmorillonite powder of light green-yellow, wherein the modified montmorillonite powder contains a plurality of the nickel ion nuclear seeds.

Next, 30.0 mg of the modified montmorillonite powder containing a plurality of the nickel ion nuclear seeds is taken and placed in a quartz boat and moved into a quartz tubular reactor as preparation for step S3. First, the quartz tube is evacuated and purged with argon (Ar) gas to remove air and contaminants. After that, the argon gas is switched to hydrogen gas to perform step S3, which is to prepare carbon nanotubes by thermal chemical vapor deposition (CVD). First, a hydrogen gas is supplied to pass through the substrate, and the substrate is heated to a reduction temperature about 600° C. for 1 hour and then flushed with argon for 10 minutes. Then, step S4 is proceed to switch the carbon source gas and protective gas of $C_2H_2/H_2$ mixture with a total flow of 200 sccm (mL/min) into the quartz reactor, and heat the substrate to the generation temperature of 750° C. for 1 hour to grow carbon nanotubes, wherein the growth temperature of 750° C. is greater than the reduction temperature of 600° C. After a plurality of carbon nanotubes are formed on the substrate, the substrate is slowly cooled to room temperature in an argon atmosphere, and finally a three-dimensional carbon nanotube composite structure is collected.

Specifically, the three-dimensional carbon nanotube composite structure is based on a two-dimensional substrate based on montmorillonite to generate a plurality of carbon nanotubes (CNTs), so the three-dimensional carbon nanotube composite structure can be regarded as montmorillonite-based carbon nanotube composites (MCNTs). It can be understood that, between the above steps S2 and S3, the step of transferring the modified montmorillonite powder containing a plurality of the nickel ion nuclear seeds to a quartz tube reactor and the step of cleaning with argon (Ar) gas can be omitted through the integration of the equipment machines, or expanded by the separation of the equipment machines.

It is worth mentioning that the montmorillonite mentioned in step S2 is immersed in an aqueous solution of cetyltrimethylammonium bromide (CTAB) to form a treated montmorillonite containing surfactant intercalation. Since cetyltrimethylammonium bromide is a cationic surfactant, it can increase the distance between the interlayers of montmorillonite. In this way, when the montmorillonite is subsequently modified by nickel ions, the nickel ion nuclear seeds can more smoothly replace the surfactant compounds on the treated montmorillonite to form the modified montmorillonite rich in nickel ion intercalation.

In some embodiments, when multiple sheets of graphene oxide (GO) are to be used as the raw material of the substrate, in order to facilitate the process, multiple sheets of graphene oxide can be pre-treated into a gel in step S1 to form a gel containing a plurality of sheets of graphene oxide, and then the gel containing these graphene oxides is put into step S2, so this step S2 can be subdivided into the following steps:

The gel containing a plurality of sheets of graphene oxide is mixed with ethylene glycol, and heated at 110° C. for 1 hour to prepare a hydrogel solution;

The hydrogel solution is rinsed several times with large amounts of deionized water until the hydrogel exhibited neutral characteristics to form a neutral hydrogel;

The neutral hydrogel is immersed in a 0.001 M nickel sulfate ($NiSO_4$ $6H_2O$) aqueous solution to form a modified hydrogel solution, and the modified hydrogel is separated by centrifugation;

The modified hydrogel is frozen for 24 hours, and then transferred to a freeze dryer set at 85° C. to dry for more than 72 hours to prepare a modified aerogel; and The black modified aerogel is ground to obtain a uniform modified graphene oxide powder, wherein the modified graphene oxide powder contains a plurality of the nickel ion nuclear seeds.

Next, 30.0 mg of the modified graphene oxide powder containing a plurality of the nickel ion nuclear seeds is taken and placed in a quartz boat and moved into a quartz tubular reactor as preparation for step S3. First, the quartz tube is evacuated and purged with argon (Ar) gas to remove air and contaminants. After that, the argon gas is switched to hydrogen gas to perform step S3, which is to prepare carbon nanotubes by thermal chemical vapor deposition (CVD). First, a hydrogen gas is supplied to pass through the substrate, and the substrate is heated to a reduction temperature about 550° C. for 1 hour and then flushed with argon for 10 minutes. Then, step S4 is proceed to switch the carbon source gas and protective gas of $C_2H_2/H_2$ mixture with a total flow of 200 sccm (mL/min) into the quartz reactor, and heat the substrate to the generation temperature of 650° C. for 1 hour to grow carbon nanotubes, wherein the growth temperature of 650° C. is greater than the reduction temperature of 550° C. After a plurality of carbon nanotubes are formed on the substrate, the substrate is slowly cooled to room temperature in an argon atmosphere, and finally a three-dimensional carbon nanotube composite structure is collected. Specifically, the three-dimensional carbon nanotube composite structure is based on a two-dimensional substrate based on graphene oxide to generate a plurality of carbon nanotubes (CNTs), so the three-dimensional carbon nanotube composite structure can be regarded as graphene oxide-based carbon nanotube composites (GCNTs). It can be understood that, between the above steps S2 and S3, the step of transferring the modified graphene oxide powder containing a plurality of the nickel ion nuclear seeds to a quartz tube reactor and the step of cleaning with argon (Ar)

gas can be omitted through the integration of the equipment machines or expanded by the separation of the equipment machines.

In this embodiment, the second temperature is greater than or equal to the first temperature; preferably, the volume mixing ratio of the protective gas and the carbon source gas is 1:9; the protective gas includes hydrogen, nitrogen, ammonia or inert gases, such as Helium (He), neon (Ne), argon (Ar), krypton (Kr), xenon (Xe) and radon (Rn), preferably, the protective gas is hydrogen; the carbon source gas comprises carbon monoxide (CO), methane ($CH_4$), acetylene ($C_2H_2$), ethane ($C_2H_6$), ethylene ($C_2H_4$), propylene ($C_3H_6$) or propyne ($C_3H_4$); in a preferred embodiment, the carbon source gas is acetylene.

Figure 3:
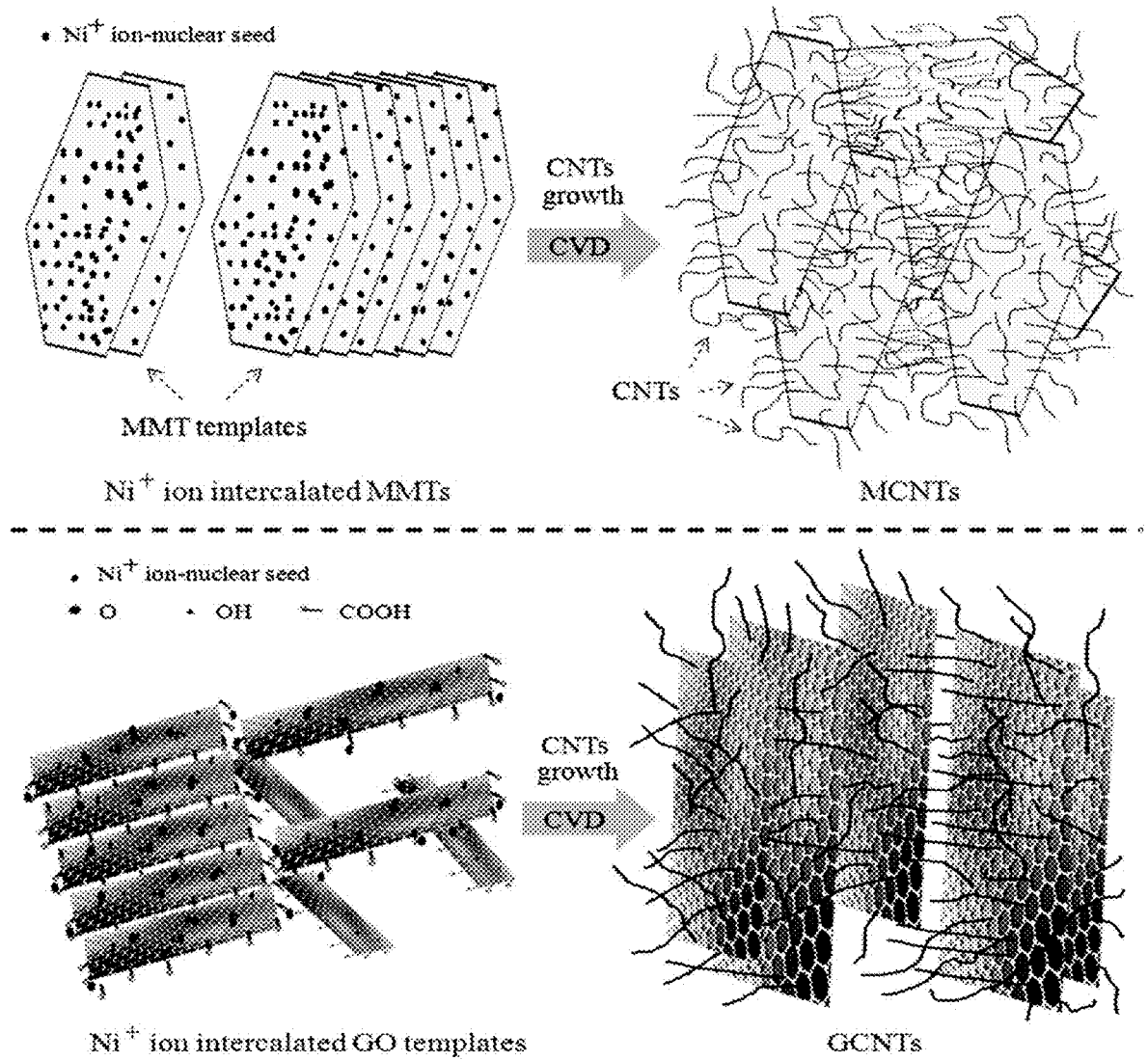
FIG. 3 is a diagram showing the growth mechanism of the three-dimensional carbon nanotube composite structure prepared by thermal chemical vapor deposition on the substrate modified with nickel ions according to the present invention.

It is worth mentioning that the present invention proposes the above-mentioned growth mechanism for preparing the three-dimensional carbon nanotube composite structure through thermal chemical vapor deposition (CVD) on the substrate modified by nickel ions, as shown in FIG. 3. When the substrate is montmorillonite (MMT), due to the ion-exchange driving force, the catalyst particles formed by nickel ion nuclear seeds are self-arranged and intercalated spontaneously into the MMT substrate surfaces and layers for the growth of a plurality of carbon nanotubes (CNTs). On the other hand, when the substrate is graphene oxide (GO), due to the presence of surface functional groups (e.g. carboxylic groups, hydroxyl groups, and carbonyl groups), the forming catalyst particles from nickel ion nuclear seeds are self-arranged spontaneously into a graphene oxide (GO) substrate layer for the growth of multiple carbon nanotubes (CNTs). The carbon source subsequently begins to diffuse to the $H_2$ reduced nickel ion nuclear seeds to form the eutectic montmorillonite-based carbon nanotube composites (MCNTs) and graphene oxide-based carbon nanotube composites (GCNTs) by raising the temperature via CVD.

The pyrolysis carbon source at a high temperature diffuses and deposits on the roots of the eutectic nickel ion nuclear catalytic particles, which demonstrates the top-growth of MCNTs and GCNTs. The gas-phase carbon source is continuously deposited and gradually pushes the nuclear particles upward to form carbon nanotubes (CNT). The invention suggested that the nickel ion nuclear seeds are the important catalytic nuclear seeds, which are considered to grow MCNTs and GCNTs from the surfaces of MMT and GO nanosheets by thermal CVD, respectively.

Figure 4A:
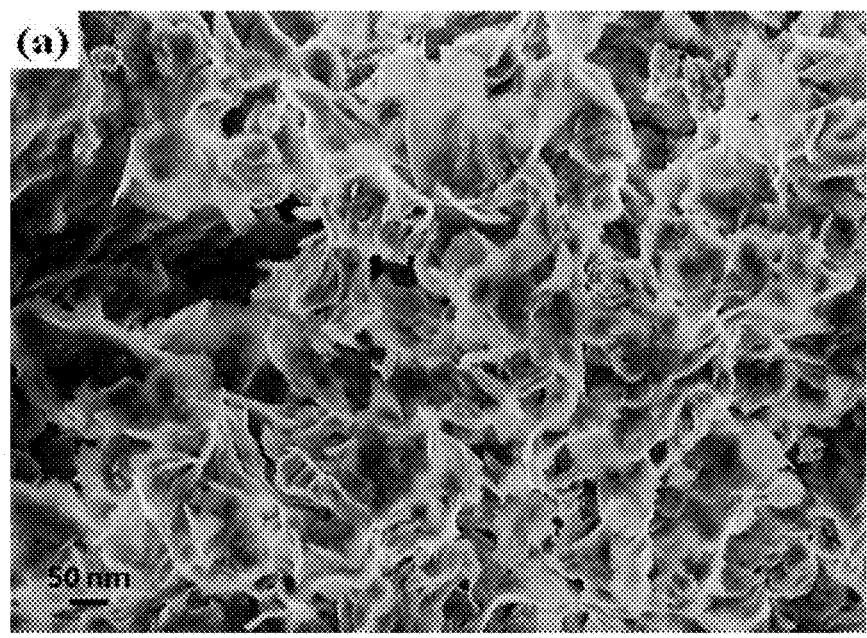
FIGS. 4a-4g are electron microscope images of the three-dimensional carbon nanotube composite structure prepared by thermal chemical vapor deposition on the substrate modified with nickel ions according to the present invention.
Figure 4B:
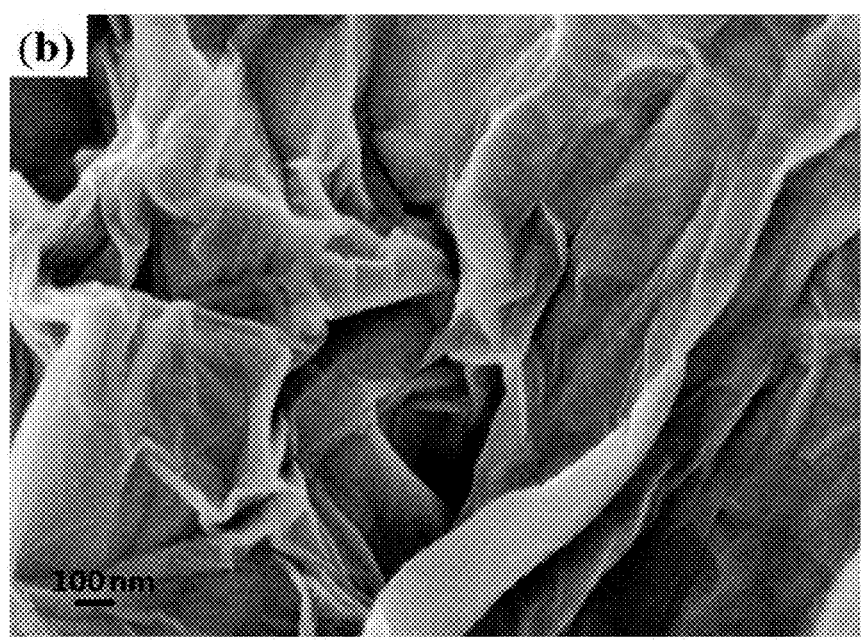
Figure 4C:
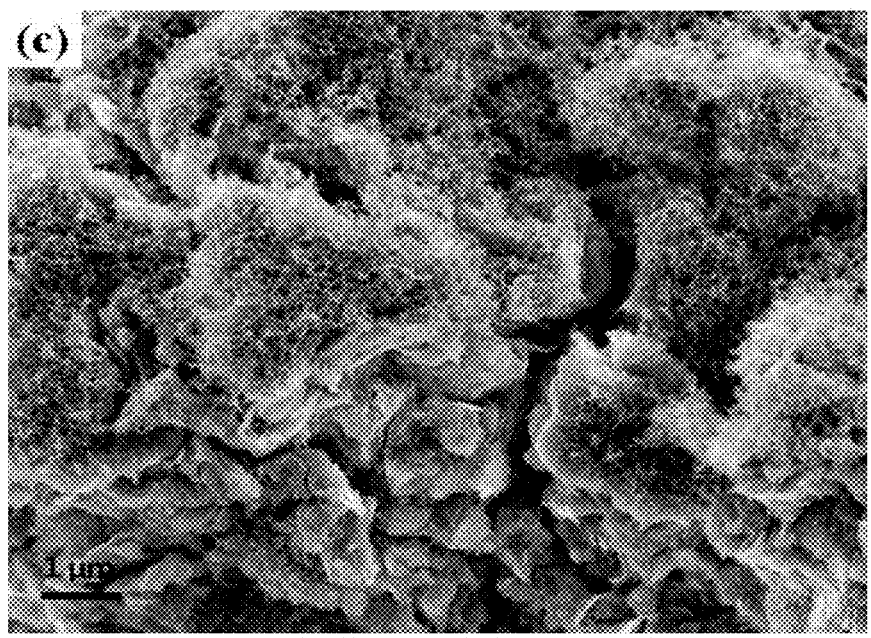
Figure 4D:
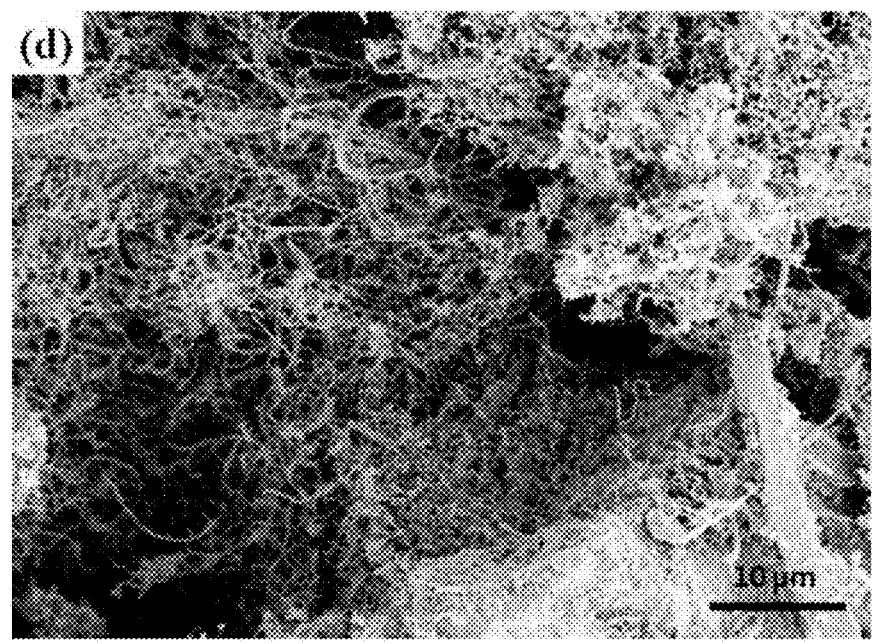
Figure 4E:
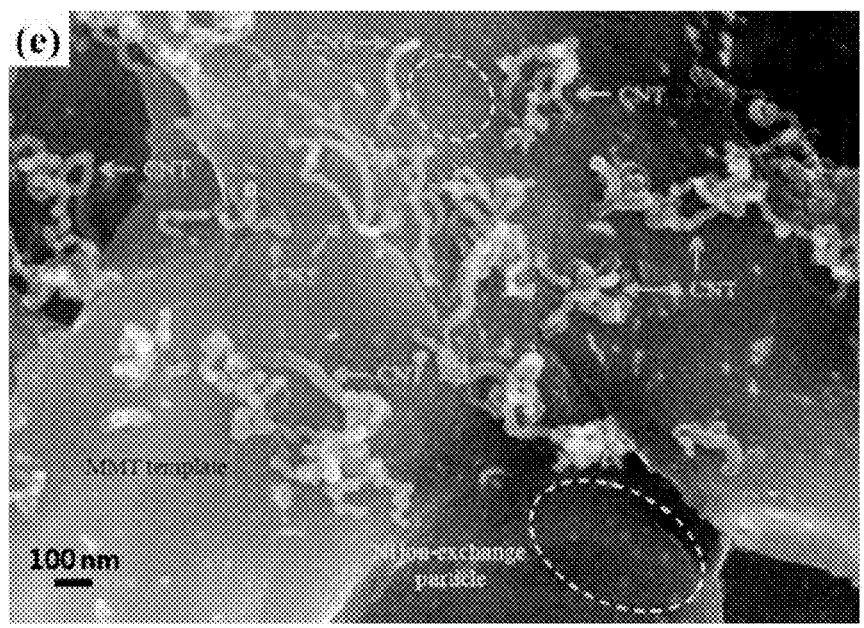
Figure 4F:
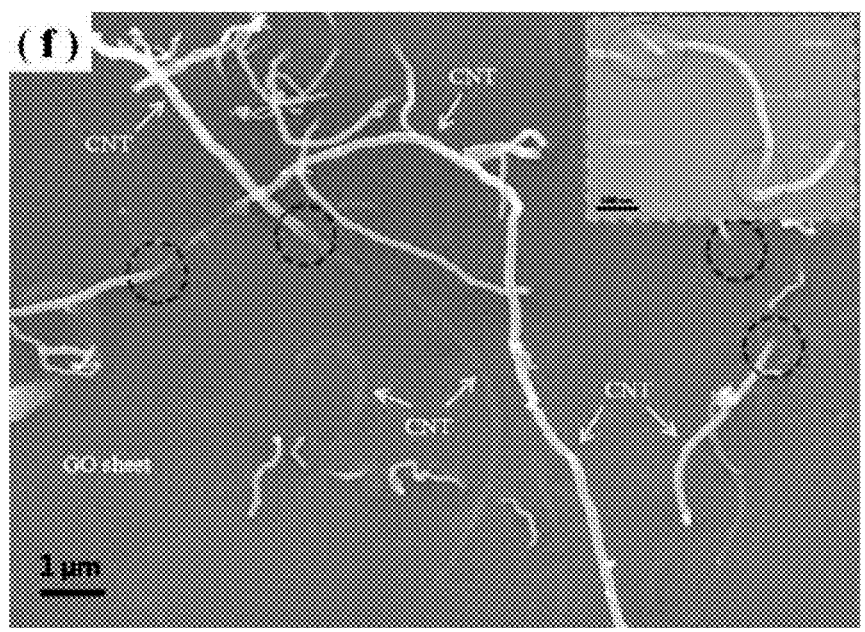
Figure 4G:
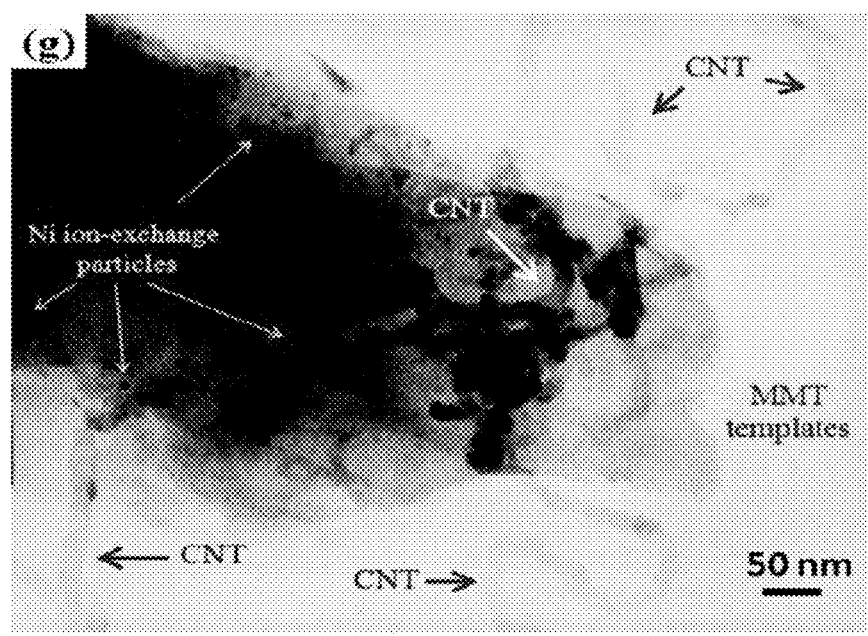

Referring to FIGS. 4a and 4b, the FESEM top view of the original surface morphology of montmorillonite (MMT) and graphene oxide (GO) treated by nickel ion exchange. The montmorillonite (MMT) and graphene oxide (GO) nanosheets mainly exhibit surface aggregation and exterior wrinkled appearance owing to their high specific surface activity. Through CNT growth by CVD of both two materials, the top-view morphologies of 3D MCNTs and GCNTs are shown in FIGS. 4c and 4d, respectively. Layered MMT delamination, GO split nanosheets, and CNT networks are obviously observed, and in addition, they are apparently almost twisted and entangled with each other. Higher magnification of FESEM and HRTEM images of the inner surface of 3D MCNT composite are shown in FIGS. 4e and 4g, respectively. Short worm-like CNTs seem to be grown in random directions on the MMT template surface because of the diffusion limitation of the carbon source inside MMT layers. Moreover, nickel ion-exchange nuclear seeds transfer to form the eutectic nickel ion intercalated catalyst particles (in yellow dash circles) for catalytic pyrolysis of $C_2H_2$ at high temperatures during the CVD process. It is probably suggested that initial aggregated MMT layers split to form the delamination and exfoliated MMT platelayers, partially because of the growth of long CNTs. Similarly, the growth mechanism, conditions, and circumstances of GCNTs shown in FIG. 4f are almost similar to those of MCNTs. The CNT bottom-root base connects and penetrates firmly with the surfaces of MMT or GO substrate plates. In particular, the CNTs even covered by the GO nanosheets can still be vaguely seen.

Figure 5:
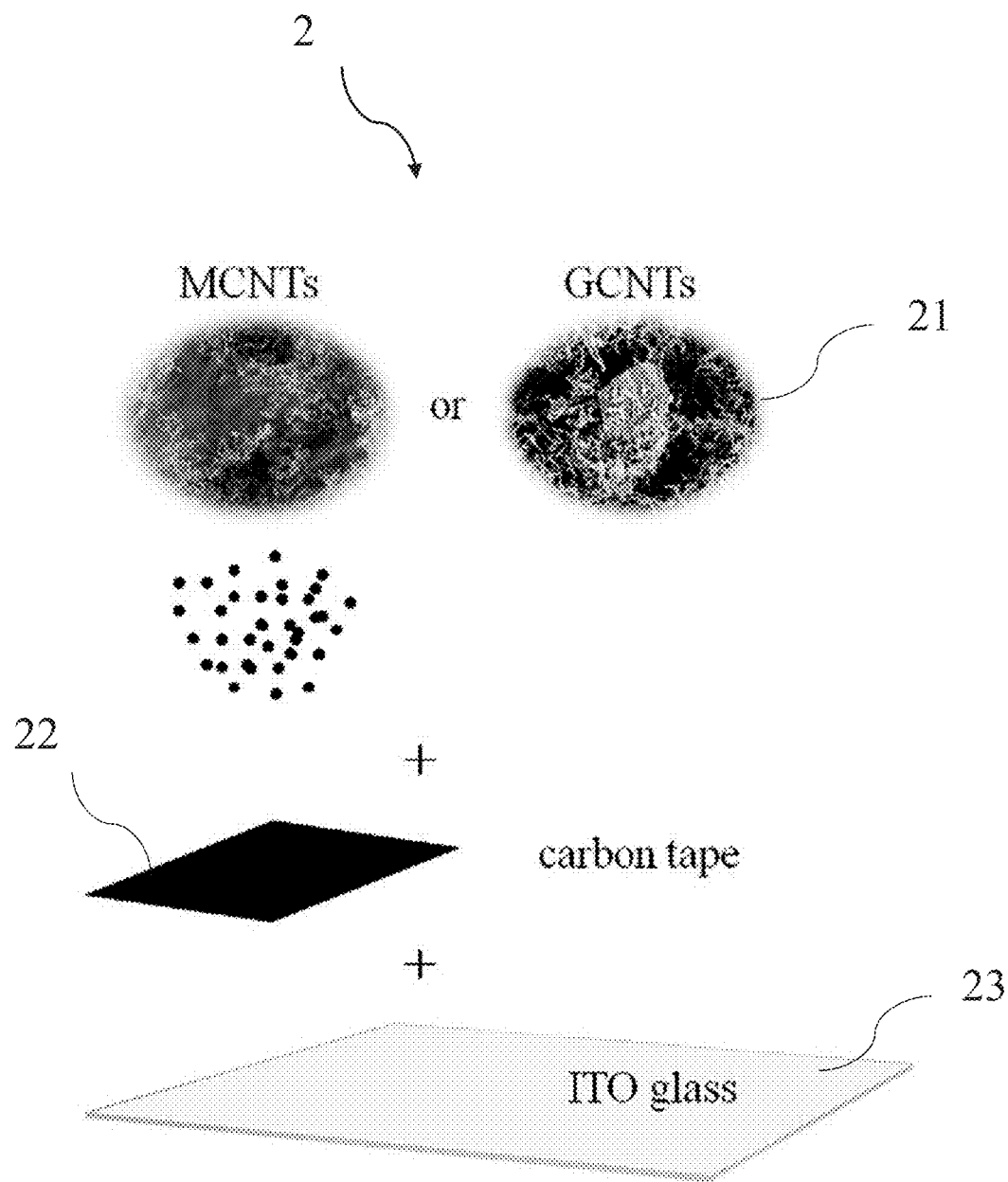
FIG. 5 is a schematic structural diagram of a component of a working electrode of the present invention.

Another embodiment of the present invention provides a working electrode 2, please refer to FIG. 5, which is a schematic structural diagram of the working electrode 2 to illustrate the corresponding relationship between the components of the working electrode 2. The working electrode 2 includes a conducting and draining material 23, a conductive adhesive material 22 and a plurality of three-dimensional carbon nanotube composite structures 21, wherein the conductive adhesive material 22 is disposed on the conducting and draining material 23, and the plurality of the three-dimensional carbon nanotube composite structure 21 is disposed on the conductive adhesive material 22; the aforementioned conducting and draining material 23, the conductive adhesive material 22 and the plurality of three-dimensional carbon nanotube composite structures 21 are pressed and adhered to form the working electrode 2; the conducting and draining materials 23 are, such as ITO conductive glass, FTO conductive glass, nickel bubble mesh, lead plate, carbon plate that is resistant to acid and alkali, conductive polymer composite material or stainless steel metal material; the conductive adhesive material 22 comprises various forms of carbon materials, such as carbon tape, carbon cloth, graphite felt, carbon felt, graphite paper, carbon paper, graphite brush or carbon brush; in a preferred embodiment, the conductive adhesive material is carbon tape; the three-dimensional carbon nanotube composite structure 21 is, such as the aforementioned montmorillonite-based carbon nanotube composite material or graphene oxide-based carbon nanotube composite material. In other embodiments, the working electrode 2 further includes a conductive electrolyte, and when the working electrode 2 is in use, the conductive electrolyte includes liquid, colloidal, pseudo-solid, all-solid, aqueous, polymer electrolyte and energy storage devices are set up in use.

Specifically, the working electrodes formed by the montmorillonite-based carbon nanotube composites (MCNTs) and the graphene oxide-based carbon nanotube composites (GCNTs) of the present invention are subjected to the following experimental analysis to verify its excellent performance.

Embodiment 1

The working electrodes prepared from MCNT and GCNT are analyzed by galvanostatic charge-discharge (GCD). Please refer to FIGS. 6a and 6b, which are graphs of the results of galvanostatic charge-discharge analysis of the working electrodes prepared from MCNT and GCNT, respectively. They show the specific capacitance (Cs) of MCNT and GCNT electrodes at different current densities. All GCD curves collected of MCNT and GCNT electrodes at various current densities in the potential range between 0 and 0.5 V are almost symmetric. Most GCD curves exhibit approximate triangular shapes in FIGS. 6a and 6b, and the charging slope increases with the decreasing charging current density. The GCD curves at lower current densities of 0.02 A/g for MCNTs, 0.1 and 0.2 A/g for GCNTs are nearly quasi rectangular shapes that differ from triangular ones. The quasi-symmetric rectangular curve and sharp linear plot observed in FIGS. 6a and 6b can suggest the contribution from conductive CNTs and layered MMT or GO template sheet composite for electrochemical double-layer capacitors (EDLC) capacitance.

Figure 6A:
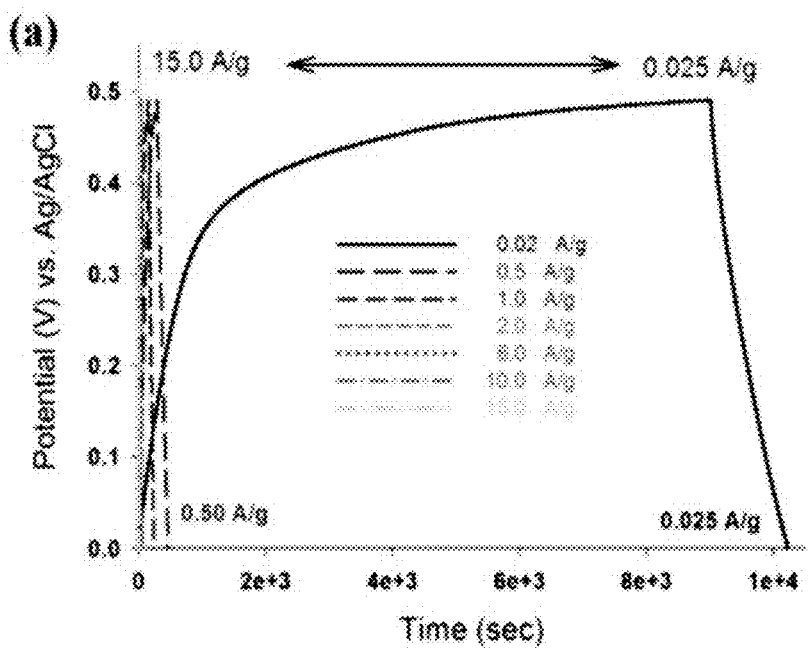
FIGS. 6a-6b are graphs showing the results of galvanostatic charge-discharge tests of the working electrodes of MCNT and GCNT of the present invention, respectively.
Figure 6B:
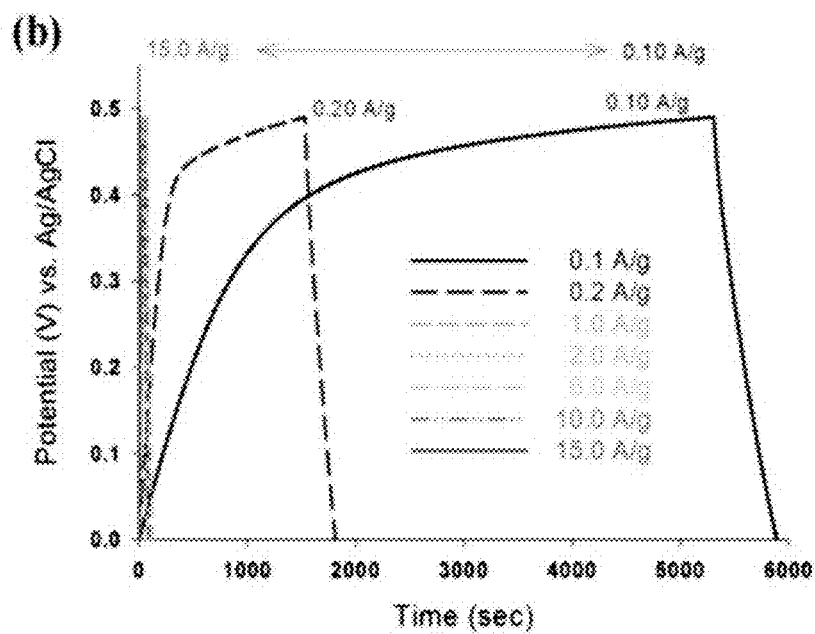

In this analysis result, according to the rectangular area in FIG. 6a, 6b, the quasi-rectangular area demonstrates nearly achieving the maximum Cs and energy density to charge and fill in actual with MCNTs (510 F/g) or GCNTs (1177 F/g). In addition, the energy density values of MCNT-based electrodes are estimated as 63.8, 58.0, 57.5, 22.5 20.3, 5.56, and 4.43 Wh/kg with corresponding power density values of 0.02, 0.45, 0.88, 1.75, 5.28, 9.08, and 13.4 kW/kg, respectively. Furthermore, the energy density values of GCNT-based electrodes are calculated as 147, 90.4, 28.8, 31.3 18.0, 14.3, and 8.63 Wh/kg with corresponding power density values of 0.09, 0.18, 0.90, 1.79, 5.41, 8.94, and 13.1 kW/kg, respectively. It demonstrates that electrolyte ions and electrons at lower current density enhance diffusion, transport, and charge steadily in the 3D structure of MCNT and GCNT composites to form EDLC storage materials. As a result, residue 2D MMT templates and GO sheets inside the as-synthesized 3D composites appear to facilitate and enhance the performance of capacitor storage. In other words, excellent capacity and energy density demonstrate the potential capability of 3D MCNT and GCNT composite materials for further energy storage application.

Embodiment 2

In the present embodiment, electrochemical AC impedance spectroscopy (EIS) analysis is carried out with the prepared working electrode, and the EIS system measures the behavior of the battery electrode and analyzes the electronic impedance of the material. It obtains the AC impedance analysis spectrum (Nyquist plot) by the AC impedance spectrometer so as to analyze the electrochemical reaction power that may occur inside the battery.

Figure 7:
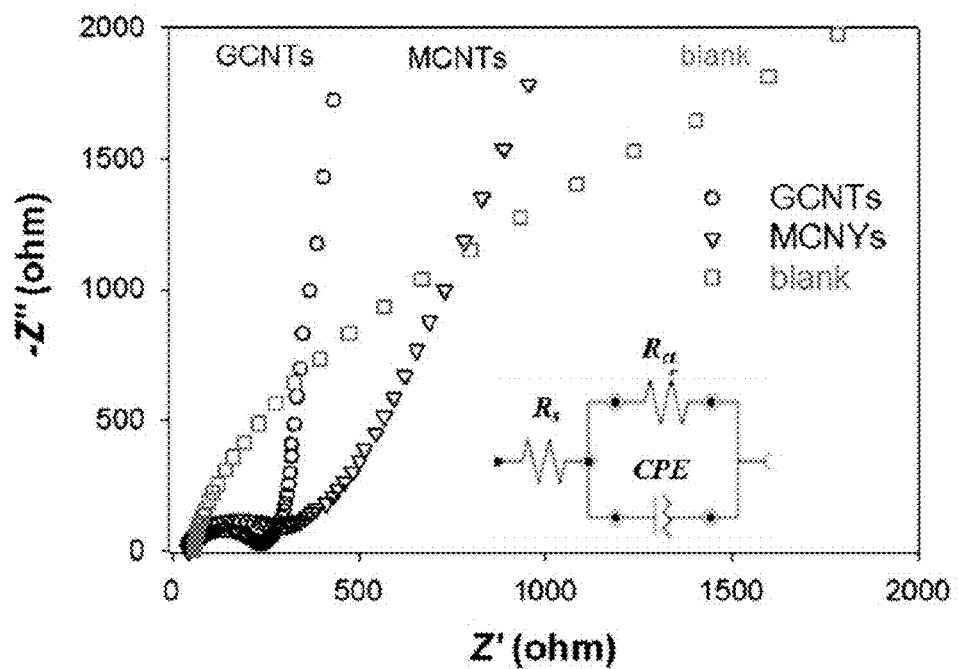
FIG. 7 is a trend diagram of the AC impedance analysis performed by the composite working electrode of the present invention.
Figure 8A:
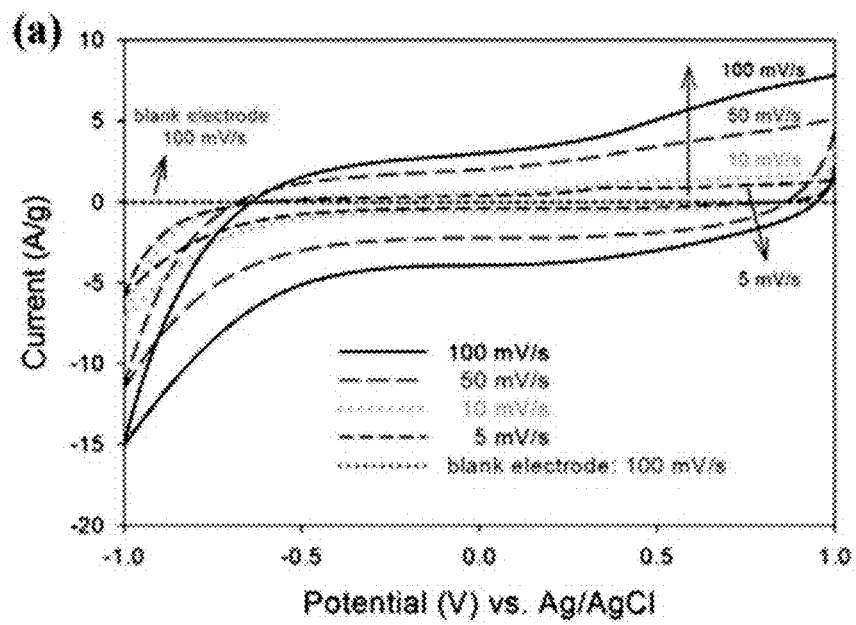
FIGS. 8a and 8c are cyclic voltammetry analysis curves of the working electrode prepared by the present invention at a voltage of −1.0 to 1.0V.
Figure 8B:
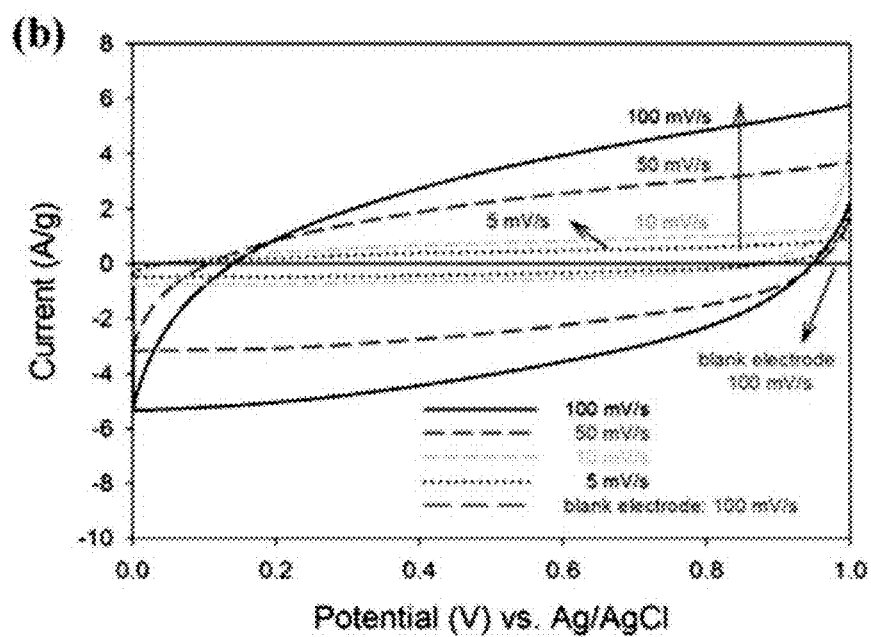
FIGS. 8b and 8d are cyclic voltammetry analysis curves of the working electrodes prepared by the present invention at a voltage of 0 to 1.0V.
Figure 8C:
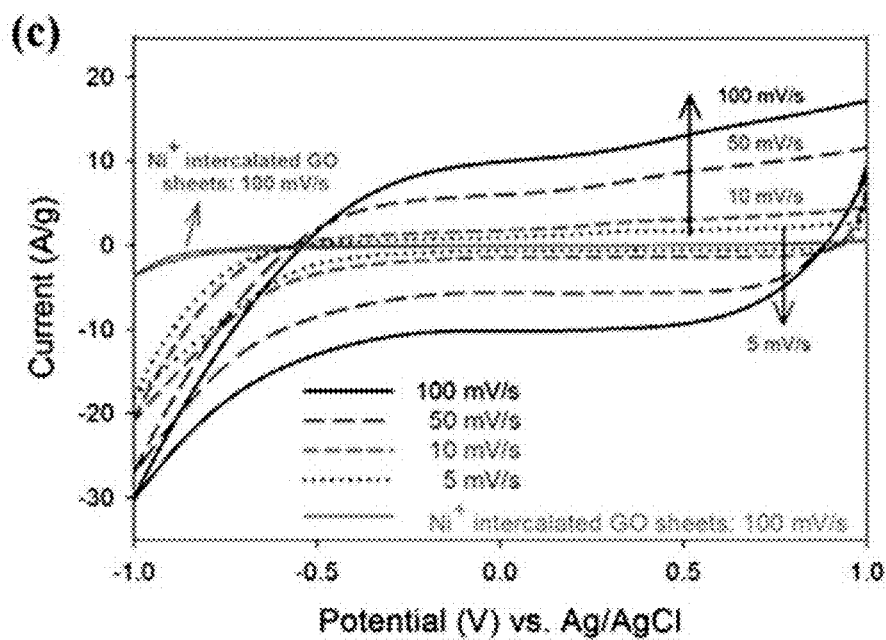
Figure 8D:
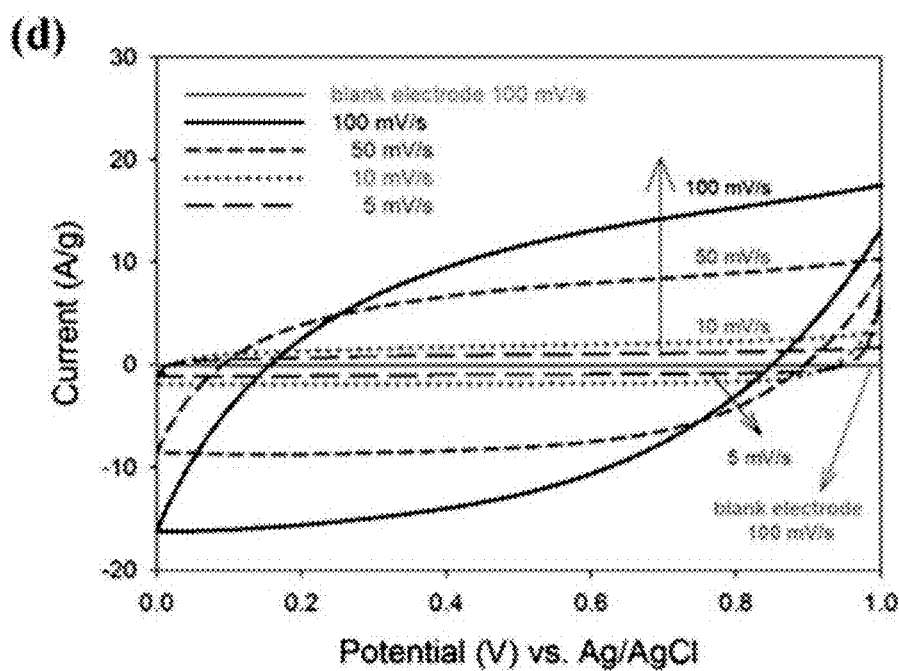

Please refer to FIG. 7, which illustrates the AC impedance spectrum of the working electrode prepared in the embodiment; as can be seen from FIG. 7, except for the blank electrode, Nyquist plots of MCNT and GCNT composite electrodes exhibit a small semicircle in the high-frequency regions in FIG. 7, suggesting the existence of charge transfer resistance and the Warburg impedance. The blank electrode exhibits a large semicircle in the low-frequency region and shows the ion diffusion limitation arising, indicating the frequency-dependent diffusion control in the low-frequency domain. Nyquist plots of the GCNT and MCNT composite electrodes display a small frequency dependent semicircle impedance curve in the high-frequency region following a vertical straight line in the middle-frequency region. With pasting the 3D active materials onto the electrodes, the slope of the straight line achieves more vertical than the blank electrode. The GCNT electrode shows a larger slope and suggests better capacitive behavior and fast ion diffusion for the EDLC electrode. The fast ion diffusion in the GCNT electrode attributes to the 3D microstructure of CNTs and GO nanosheets, possessing high porous diffusion fissure channels for electrolyte ion migration. We consider the 3D active materials to decrease the ion diffusion limitation and improve the electrolyte penetrating the structure easily.

In addition, the equivalent circuit diagram includes Rs, Rct, and a phasing element (CPE) connected in parallel with the actual capacitor; please refer to FIG. 7 again, in the AC impedance analysis of this embodiment, it can be found that the low Rs resistance is measured with the battery of the embodiment and means that the working electrode can work under extremely low voltage drive; according to the AC impedance analysis of this example, it can be seen that the three-dimensional carbon nanotube composite structure prepared by the preparation method of the present invention has low equivalent series resistance, which is the porous formed by the three-dimensional carbon nanotube composite structure on the working electrode. The structure makes the diffusion and conduction of electrolyte ions smooth, makes the electrochemical active material easier to conduct, and achieves the effect of low impedance and high conductivity.

Embodiment 3

FIG. 8 (a), (c) is a cyclic voltammetry analysis curve of the voltage −1.0V to 1.0V implemented by the working electrode of the embodiment. In the cyclic voltammetry analysis of this experimental example, silver/silver chloride (Ag/AgCl) is used as the reference electrode, and platinum metal (Pt) is used as the counter electrode, but it is not limited. The cyclic voltammetry tests are carried out in 3M NaOH(aq) electrolyte at scan rates of 5, 10, 50, and 100 mV/s respectively, to measure the induced current when the voltage of the working electrode of the embodiment drops from 1.0V to −1.0V and rises from −1.0V to 1.0V, the results are shown in FIG. 8(a), (c); it can be seen from FIG. 8(a) that the blank electrode without the 3D carbon nanotube composite structure has almost no capacitance, and the capacitance of the blank electrode can be ignored; the oxidation peak of a slight current at 0.39V is caused by the oxidation of the water solvent. At different scan rates, the curves of the induced currents are similar. That is, even when the scan rate is increased by a factor of 20 from 5 mV/s to 100 mV/s, the measured current curve loop is not distorted. In addition to being reversible in the oxidation/reduction electrochemical reaction, the working electrode of the embodiment has the characteristics of electric double layer capacitance.

Embodiment 4

FIG. 8 (b), (d) is a cyclic voltammetry analysis curve of the voltage 0V to 1.0V implemented by the working electrode of the embodiment 2. In the cyclic voltammetry analysis of this experimental example, silver/silver chloride (Ag/AgCl) is used as the reference electrode, and platinum metal (Pt) is used as the counter electrode, but it is not limited. The cyclic voltammetry tests are carried out in 3M NaOH(aq) electrolyte at scan rates of 5, 10, 50, and 100 mV/s respectively, to measure the induced current when the voltage of the working electrode of the embodiment drops from 1.0V to 0V and rises from 0V to 1.0V, the results are shown in FIG. 8(b), (d); FIGS. 8(b) and (d) are the results measured by the working electrode of Example 2. It can be seen from FIGS. 8(b) and (d) that the blank electrode without the 3D carbon nanotube composite structure has almost no capacitance generated, the capacitance of the blank electrode can be ignored; the oxidation peak of a slight current at 0.39V is caused by the oxidation of the water solvent. At different scan rates, the curves of the induced currents are similar. That is, even when the scan rate is increased by a factor of 20 from 5 mV/s to 100 mV/s, the measured current curve loop is not distorted. In addition to being reversible in the oxidation/reduction electrochemical reaction, the working electrode of the embodiment has the characteristics of electric double layer capacitance; in the induced current curve presented by the working electrode of this embodiment, the circuit of the measured current is approximately rectangular, which clearly indicates that the working electrode of this embodiment has the characteristics of electric double layer capacitance in electrochemical reaction. Slow scanning rates enhance the electrode to achieve high Cb because of the superior conductivity of 1D CNTs and 2D-layered MMT or GO templates inside the MCNT- or GCNT-based electrodes, which facile transport and diffusivity between the electron, electrolyte, and electrode. Compared with single-type CNTs, 3D MCNT and GCNT composite electrodes perform obviously large-layered template areas for electrolyte ions, indicating the partially significant contribution of MMT or GO sheets to the storage capacitance.

Embodiment 5

Figure 9A:
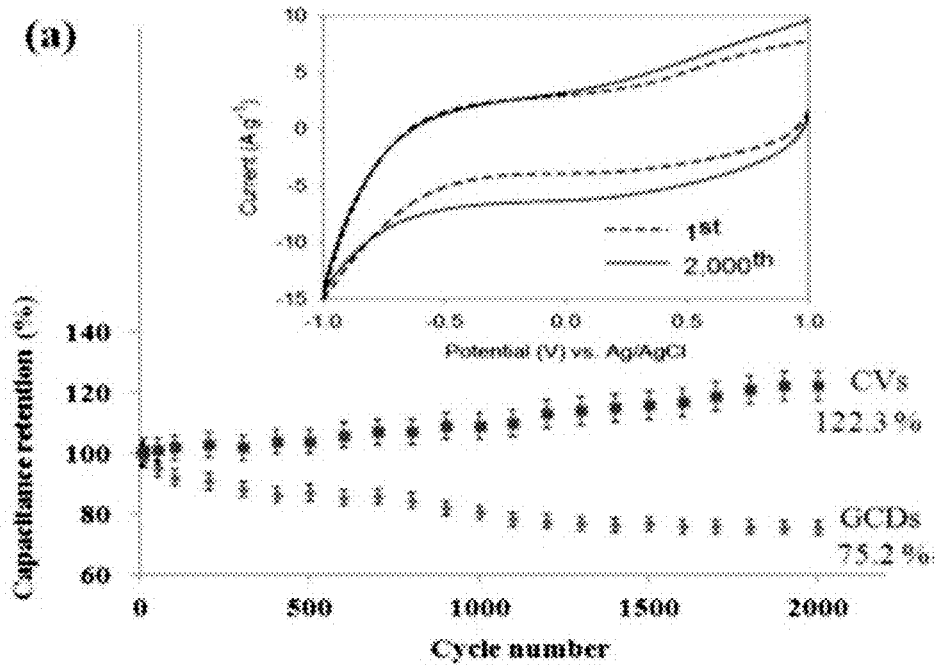
FIGS. 9a and 9b are the trend diagrams of the cyclic voltammetry (CV) cycle experiments of the MCNT and GCNT working electrodes of the present invention, respectively.
Figure 9B:
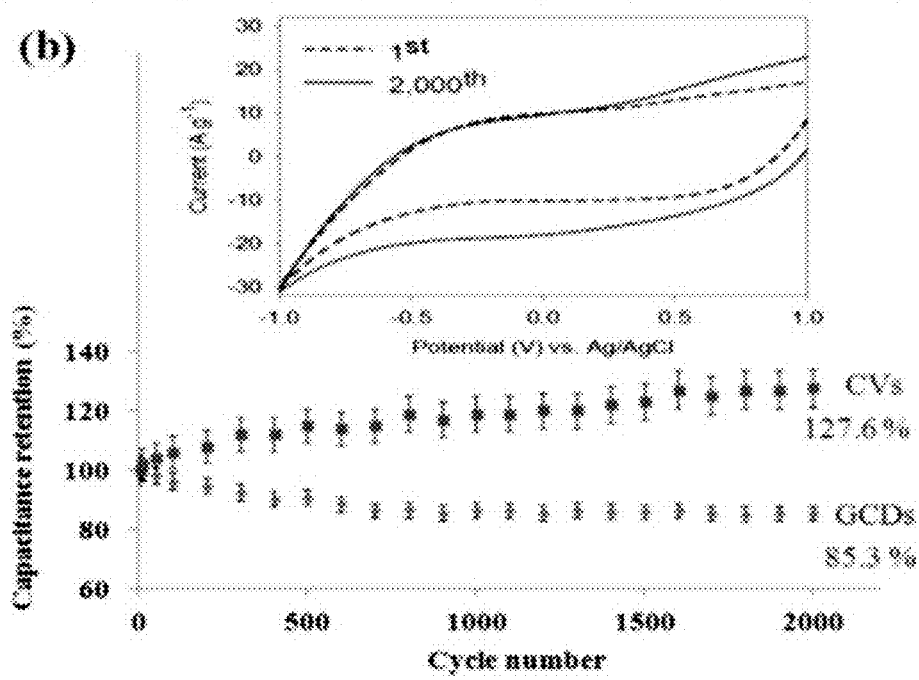

As shown in FIG. 9, the battery is equipped with the working electrode 3D MCNT and GCNT electrodes of the embodiment. After 2000 continuous CV and GCD cyclic experiments at a current density of 1.0 A/g, the specific capacitance retentions with 5% error bars of 3D MCNT and GCNT electrodes achieve 122.3% and 127.6%, respectively. It shows that the working electrode provided by the present invention can not only maintain the original specific capacitance under the condition of cyclic charge and discharge, but also further increase the specific capacitance;

Due to the gradual wetted interface between the working electrode and the electrolyte and more ion-accessible area of the CNTs network structure, the composite electrode material prepared by it shows low ionic resistance and the rapid migration electrolyte ions in conductive three-dimensional carbon nanotube composites. In addition, the 3D carbon nanotube composite electrode exhibits good conductivity and low charge transfer resistance, which are beneficial to fast charge transfer between the composite electrode materials and electrolytes.

According to the preparation method provided by the present invention, the three-dimensional carbon nanotube composite structure has the following advantages:

1. The method of the three-dimensional carbon nanotube composite structure prepared by the present invention is an environmentally friendly process method, and the three-dimensional carbon nanotube composite structure can be prepared without adding a metal catalyst in the process.
2. The process of the three-dimensional carbon nanotube composite structure prepared by the present invention utilizes nickel ion modification treatment to form nickel ion nuclear seeds on the substrate, so there is no need to use precious metals and rare metals as catalysts in the process. It can effectively reduce the manufacturing cost, which is economical and environmentally friendly.
3. The three-dimensional carbon nanotube composite structure can be prepared without adding a metal catalyst in the process of the three-dimensional carbon nanotube composite structure prepared by the present invention, so the process of the present invention can significantly reduce the needs of precious metals and rare metals.
4. The three-dimensional carbon nanotube composite structure prepared by the present invention is that the one-dimensional carbon nanotube and the two-dimensional layered substrate are joined at the bottom of the base to increase the electrical conductivity of the carbon nanotube and the layered substrate. The electron and ion double layers and electron transfer are stabilized, which can effectively improve the electrode capacitance and energy density To sum up, the three-dimensional carbon nanotube composite structure prepared by the present invention has quite high application potential in supercapacitors, electric double layer capacitors, pseudo capacitors, all-solid capacitors and related energy storage elements and cell materials.

It is to be understood that the foregoing descriptions of the embodiments are given by way of example only, and various modifications may be made by those skilled in the art to which this field pertains. The above specification and examples provide a complete description of the flow of exemplary embodiments of the invention and their uses. Although the above embodiments disclose specific embodiments of the present invention, they are not intended to limit the present invention. Those with ordinary knowledge in the technical field to which the present invention pertains, without departing from the principle and spirit of the present invention, can make various changes and modifications to it, so the protection scope of the present invention should be defined by the appended claims.

What is claimed is:

1. A method for preparing a three-dimensional carbon nanotube composite structure comprises:
   step S1: providing a substrate, wherein the substrate is a montmorillonite or a graphene oxide;
   step S2: subjecting the substrate to nickel ion modification treatment to form at least one nickel ion nuclear seed on the substrate;
   step S3: providing a hydrogen gas to pass through the substrate and heating the substrate to a reduction temperature for reducing the nickel ion nuclear seed by the hydrogen gas at the reduction temperature; and
   step S4: supplying a carbon source gas and a protective gas to pass through the substrate and heating the substrate to a growth temperature so that the carbon atoms generated by the carbon source gas through the catalytic cracking of the nickel ion nuclear seed are deposited on the bottom of the nickel ion nuclear seed to form a carbon nanotube gradually, wherein the growth temperature is greater than or equal to the reduction temperature;
   wherein, while the substrate is the montmorillonite, the step S2 comprises:
     immersing the montmorillonite in an aqueous solution of cetyltrimethylammonium bromide to form a treated montmorillonite with surfactant intercalation;
     washing the treated montmorillonite with deionized water and drying to form a dry treated montmorillonite;
     immersing the dry treated montmorillonite in an aqueous nickel acetate solution to replace the surfactant to form a modified montmorillonite containing intercalated nickel ions; and
     washing the modified montmorillonite with deionized water and dry to obtain a modified montmorillonite powder, wherein the modified montmorillonite powder contains a plurality of the nickel ion nuclear seeds; or
   wherein, while the substrate is the graphene oxide, the step S1 comprises: preprocessing a plurality of sheets of graphene oxide into a gel to form a gel containing the graphene oxide, the step S2 comprises:
     mixing the gel containing the graphene oxides and ethylene glycol with heat to prepare a hydrogel solution;

washing the hydrogel solution with deionized water to form a neutral hydrogel;

immersing the neutral hydrogel in an aqueous nickel sulfate solution to form a modified hydrogel solution, and the modified hydrogel is separated by centrifugation;

freeze-drying the modified hydrogel to produce a modified aerogel; and grinding the modified aerogel to obtain modified graphene oxide powders, wherein the modified graphene oxide powders comprise a plurality of the nickel ion nuclear seeds.

2. The method as claimed in claim 1, wherein the substrate is selected from a group consisting of soil clay, montmorillonite (MMT) and graphene oxide (GO).

3. The method as claimed in claim 1, wherein the carbon source gas comprises carbon monoxide, methane, acetylene, ethane, ethylene, propylene or propyne; the protective gas comprises hydrogen, nitrogen, ammonia or inert gas.

4. A three-dimensional carbon nanotube composite structure, comprising:
a substrate;
at least one nickel ion nuclear seed disposed on the substrate; and
at least one carbon nanotube connected to the nickel ion nuclear seed;
wherein, the three-dimensional carbon nanotube composite structure is prepared by a method comprising:
step S1: providing the substrate, wherein the substrate is a montmorillonite or a graphene oxide;
step S2: subjecting the substrate to nickel ion modification treatment to form at least one nickel ion nuclear seed on the substrate;
step S3: providing a hydrogen gas to pass through the substrate and heating the substrate to a reduction temperature for reducing the nickel ion nuclear seed by the hydrogen gas at the reduction temperature; and
step S4: supplying a carbon source gas and a protective gas to pass through the substrate and heating the substrate to a growth temperature so that the carbon atoms generated by the carbon source gas through the catalytic cracking of the nickel ion nuclear seed are deposited on the bottom of the nickel ion nuclear seed to form the carbon nanotube gradually, wherein the growth temperature is greater than or equal to the reduction temperature;
wherein, while the substrate is the montmorillonite, the step S2 comprises:
immersing the montmorillonite in an aqueous solution of cetyltrimethylammonium bromide to form a treated montmorillonite with embedded surfactant;
washing the treated montmorillonite with deionized water and drying to form a dry treated montmorillonite;
immersing the dry treated montmorillonite in an aqueous nickel acetate solution to replace the surfactant to form a modified montmorillonite containing intercalated nickel ions; and
washing the modified montmorillonite with deionized water and dry to obtain a modified montmorillonite powder, wherein the modified montmorillonite powder contains a plurality of the nickel ion nuclear seeds; or
wherein, while the substrate is the graphene oxide, the step S1 comprises: preprocessing a plurality of sheets of graphene oxide into a gel to form a gel containing the graphene oxide, the step S2 comprises:
mixing the gel containing the graphene oxides and ethylene glycol with heat to prepare a hydrogel solution;
washing the hydrogel solution with deionized water to form a neutral hydrogel;
immersing the neutral hydrogel in an aqueous nickel sulfate solution to form a modified hydrogel solution, and the modified hydrogel is separated by centrifugation;
freeze-drying the modified hydrogel to produce a modified aerogel; and
grinding the modified aerogel to obtain modified graphene oxide powders, wherein the modified graphene oxide powders comprise a plurality of the nickel ion nuclear seeds.

5. The structure as claimed in claim 4, wherein the substrate is selected from a group consisting of soil clay, montmorillonite (MMT) and graphene oxide (GO).

6. The structure claimed in claim 4, wherein the substrate comprises a multi-layer structure, and the nickel ion nuclear seed is inserted between layers of the multi-layer structure.

7. The structure as claimed in claim 4, wherein the carbon source gas comprises carbon monoxide, methane, acetylene, ethane, ethylene, propylene or propyne;
the protective gas comprises hydrogen, nitrogen, ammonia or inert gas.

8. A working electrode, comprising:
a conducting and draining material;
a conductive adhesive material disposed on the conducting and draining material; and
a plurality of three-dimensional carbon nanotube composite structures disposed on the conductive adhesive material, wherein the three-dimensional carbon nanotube composite structure comprises:
a substrate;
at least one nickel ion nuclear seed disposed on the substrate; and
at least one carbon nanotube connected to the nickel ion nuclear seed;
wherein, the three-dimensional carbon nanotube composite structure is prepared by a method comprising:
step S1: providing the substrate, wherein the substrate is a montmorillonite or a graphene oxide;
step S2: subjecting the substrate to nickel ion modification treatment to form at least one nickel ion nuclear seed on the substrate;
step S3: providing a hydrogen gas to pass through the substrate and heating the substrate to a reduction temperature for reducing the nickel ion nuclear seed by the hydrogen gas at the reduction temperature; and
step S4: supplying a carbon source gas and a protective gas to pass through the substrate and heating the substrate to a growth temperature so that the carbon atoms generated by the carbon source gas through the catalytic cracking of the nickel ion nuclear seed are deposited on the bottom of the nickel ion nuclear seed to form the carbon nanotube gradually, wherein the growth temperature is greater than or equal to the reduction temperature;
wherein, while the substrate is the montmorillonite, the step S2 comprises:
immersing the montmorillonite in an aqueous solution of cetyltrimethylammonium bromide to form a treated montmorillonite with embedded surfactant;

washing the treated montmorillonite with deionized water and drying to form a dry treated montmorillonite;

immersing the dry treated montmorillonite in an aqueous nickel acetate solution to replace the surfactant to form a modified montmorillonite containing intercalated nickel ions; and washing the modified montmorillonite with deionized water and dry to obtain a modified montmorillonite powder, wherein the modified montmorillonite powder contains a plurality of the nickel ion nuclear seeds; or wherein, while the substrate is the graphene oxide, the step S1 comprises preprocessing a plurality of sheets of graphene oxide into a gel to form a gel containing the graphene oxide, the step S2 comprises:

mixing the gel containing the graphene oxides and ethylene glycol with heat to prepare a hydrogel solution;

washing the hydrogel solution with deionized water to form a neutral hydrogel;

immersing the neutral hydrogel in an aqueous nickel sulfate solution to form a modified hydrogel solution, and the modified hydrogel is separated by centrifugation;

freeze-drying the modified hydrogel to produce a modified aerogel; and grinding the modified aerogel to obtain modified graphene oxide powders, wherein the modified graphene oxide powders comprise a plurality of the nickel ion nuclear seeds.

9. The working electrode as claimed in claim 8, wherein the conducting and draining material comprises ITO conductive glass, FTO conductive glass, nickel bubble mesh, lead plate, carbon plate that is resistant to acid and alkali, conductive polymer composite material or stainless steel metal material; the conductive adhesive material comprises carbon tape, carbon cloth, graphite felt, carbon felt, graphite paper, carbon paper, graphite brush, carbon brush, conductive glue, conductive silver glue or conductive polymer.

10. The working electrode as claimed in claim 8, wherein the substrate is selected from a group consisting of soil clay, montmorillonite (MMT) and graphene oxide (GO).

11. The working electrode as claimed in claim 8, wherein the substrate comprises a multi-layer structure, and the nickel ion nuclear seed is inserted between layers of the multi-layer structure.

12. The working electrode as claimed in claim 8, wherein the carbon source gas comprises carbon monoxide, methane, acetylene, ethane, ethylene, propylene or propyne; the protective gas comprises hydrogen, nitrogen, ammonia or inert gas.

* * * * *